May 17, 1966    R. L. HIGH ET AL    3,251,748
STARCH DERIVATIVE
Filed Aug. 23, 1963
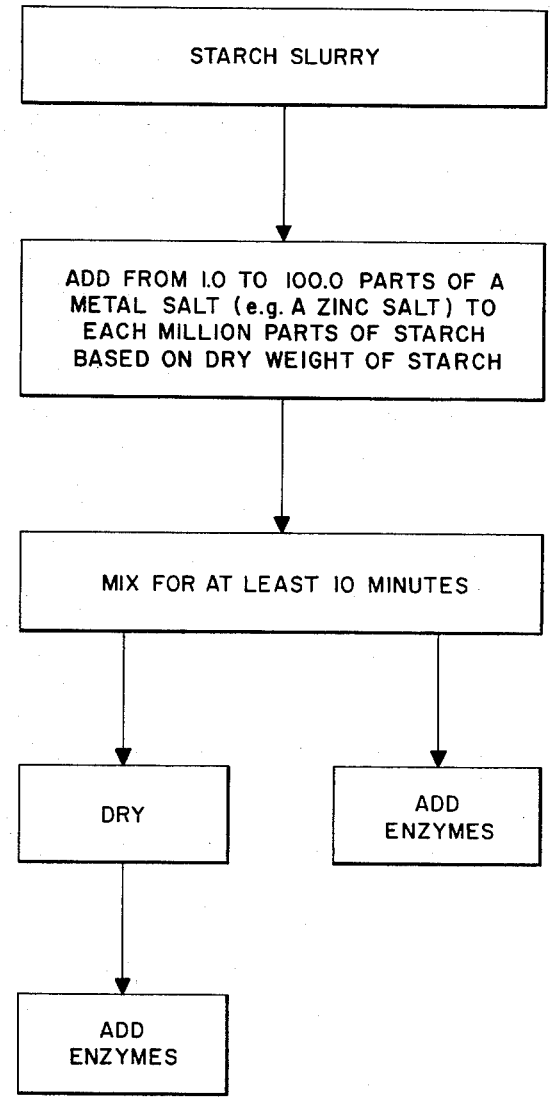
INVENTORS
ROBERT L. HIGH
SAUL ROGOLS
BY
Jerome R. Cox
ATTORNEY

United States Patent Office 3,251,748
Patented May 17, 1966

3,251,748
STARCH DERIVATIVE
Robert L. High, Canal Winchester, and Saul Rogols, Circleville, Ohio, assignors to National Industrial Products Company, Columbus, Ohio, a corporation of Ohio
Filed Aug. 23, 1963, Ser. No. 304,069
15 Claims. (Cl. 195—31)

The inventions disclosed and claimed in this application relate to starch compositions and to methods and processes of forming such compositions and of utilizing them.

Heretofore starch has been used extensively in many industries. In some of these uses, as for example in the manufacture of paper, it is necessary to liquefy the starch, and in the course of doing so it usually happens that at least some of the starch molecules are converted to other compositions of matter which are composed of smaller molecules (i.e. molecules having shorter chains). For example, in such liquefaction at least some of the starch molecules are usually converted to long chain dextrins and possibly to short chain dextrins and to sugars.

We have discovered new processes which are very successful in promoting the liquefaction of starch in shorter times and at less expense than heretofore thought possible. Moreover, and possibly more important in these processes we modify the starch so that it is more useful in the paper making process.

OBJECTS

One of the objects of the invention disclosed and claimed herein is therefore the production of new compositions of matter useful as intermediates in the production of starch products.

A further more specific object of the invention is the production of new starch compositions which are unusually susceptible to enzymatic liquefaction.

A further even more specific object is the production of metal salt starch compositions in which the salt is attached to the substrate whereby the starch may be liquefied more efficiently by enzymes than can the starches heretofore used.

A further object of the invention is the provision of new methods for producing enzyme liquefied starch.

A further object of our invention is the provision of processes for producing new starch intermediates.

Other objects, features, and advantages of the invention will be apparent from the following description and claims and from the accompanying drawing.

IN THE DRAWING

The figure is a flow sheet illustrating methods of preparing a metal salt starch composition constituting an embodiment of our invention and of liquefying such composition by enzymatic action to other useful compositions of matter.

For improvement in starch liquefaction (ease, speed, efficiency and economy) at least three approaches may be made, such as the use of substances such as enzyme accelerators or stabilizers to aid enzyme action, or removal or inactivation of substances which injure enzyme action, or modification of the starch prior to the enzyme action. We believe that possibly our improvement causes the metal salt to attach to the substrate and thus aids enzyme action by the third approach. Although we may, and often do, add the metal salt to a starch slurry together with the enzyme, we do not believe the metal salts added by us can be classified as accelerators or stabilizers of the enzymes. Calcium has heretofore been proposed and possibly used for improvement in starch liquefaction by reason of its stabilizing effect on the alpha amylase (although it has a retarding effect on beta amylase) and by reason of its supposed effect in increasing the tolerance of alpha amylase to heat. We are sure that the metal salt which we add does not work in either of these ways.

DETAILED DESCRIPTION

In the figure we have illustrated processes or methods of modifying starch to form starch compositions which are more easily liquefied by enzyme action into useful products. As is well known, much starch is usually obtained from wheat and corn and other flours by separation of the flours essentially into their starch component and into their protein (e.g. gluten or zein) component. This separation is usually accomplished by a washing process wherein the starch is washed out as dispersion in a slurry. Then often the starch is dried either in a machine by heat or is air dried. This dried starch may be remixed with water to form a slurry. Whether the starch is in a slurry or dried it may be treated by our process. Regardless of how a slurry is secured, it may be modified in our process to secure the new intermediate compositions of matter described herein. These intermediate compositions may then be changed into a liquid starch product or even if desired converted into dextrins, sugars, alcohols and other useful products more easily and economically by the action of the enzymes. As later described, we also may modify the dried starch by our process to form the desired intermediates.

We prefer that the slurry have a ratio of about 4 lbs. of starch to each gallon of water. If the slurry is obtained from the separation process, it may be concentrated or diluted to achieve this ratio. Obviously, if obtained by mixing dried starch with water, the components may be weighed or measured before being mixed to achieve the desired ratio. Any concentration of starch in the slurry is satisfactory and useful, but we prefer to use a concentration of from 3.8 lbs. to 4.0 lbs. of starch to each gallon of water.

We then prefer to add a metal salt to the slurry in a ratio in the range of from 1 to 50 parts of salt to one million parts of dry starch in the slurry. This ratio may well be about 1.5 parts of salt to a million parts starch (0.00015% based on the dry weight of the starch in the slurry). The ratio is important. If the percentage of salt to starch drops below about 0.00015%, the beneficial effect seems to drop approximately proportionately, but we have been able to measure the beneficial effect even with the addition of as low as 0.0001% and believe that any addition, no matter how small, produces a beneficial effect. If the percentage of salt appreciably exceeds about 0.0050%, the beneficial effect decreases and disappears rapidly.

The kind of salt is also important. We have used zinc chloride with success. Zinc sulfate, and cadmium chlorides and sulfates appear to be useful. Chlorides and sulfates of sodium, potassium, barium, and calcium, zinc acetates, zinc oxides, and zinc sulfite are not satisfactory. Perhaps other salts might be successful (or satisfactory) but zinc chloride exceeds in beneficial effect all other salts which we have tested.

It is necessary that the salt and the starch be mixed to a homogeneous condition. Apparently mixing for one minute is necessary to insure such homogeneous condition. We prefer that there should be continuous mixing for a period of from 10 to 30 minutes, but it is not necessary to wait for any definite period after a homogeneous mixture is attained. After the mixing, the slurry may be dried, if desired, or it may be retained in slurry form. The salt and starch should be maintained in contact for at least one minute.

We have also obtained good results by spraying a solution of zinc chloride onto dry starch. It appears that if dry zinc chloride could be added to dry starch and mixed, the same results could be obtained. However, it is difficult to measure the exact weight of dry zinc chloride required because zinc chloride is hygroscopic or hydrophilic and absorbs water excessively until it goes into solution, and a substantial exactness of the ratio of the salt to the starch is desirable and even possibly necessary.

After addition of the zinc salt, the starch is treated either in dry or slurry form with a customary enzyme to produce the end product desired.

The kinds of enzymes useful in this connection are alpha amylase enzymes such as barley, malt γ-amylase, the γ-amylase malts of wheat, rye, oats, sorghum, maise, and rice, soybean γ-amylase, sweet potato γ-amylase, microbal amylases, and animal amylases.

We prefer to heat to a temperature of about 75° C. Obviously temperatures slightly higher or lower are useful, but the enzyme will not be activated at temperatures significantly lower, and at temperatures approaching 95° C. the enzyme is permanently deactivated. The pH range is between about 6.0 to 7.5, but we prefer a pH of 6.8. The temperature is maintained in the activation range for a period of time to achieve the particular degree of liquefication desired.

Our processes and products are very useful in the paper making industry where it is desirable to liquefy the starch to mix with the cellulose pulp as an internal size in the paper making process. In addition to the improved liquefication properties our products also have improved pigment retention and strength giving properties. Our products are also useful in textile sizing where it is desirable to remove the starch size after it has achieved its purpose. Those skilled in the art will easily recognize other uses for this product.

Our process is useful with all types of starch which we have examined including cereal and non-cereal starch such as, for example, wheat, corn, rice, tapioca, arrowroot, potato and sago starches.

It is our belief that the metal complexes with the starch and forms a site where the enzyme may attach and thus increases the effect of the enzyme. However, we have found that good results are obtained whether we first add the metal to the starch and then add the enzyme and heat, or whether we mix the starch and metal and heat and then add the enzyme, or whether we mix all three ingredients simultaneously and then heat, or whether we mix the enzymes and metal and then add to the heated starch. As stated above, we may mix the metal in a starch slurry or spray a solution of the metal onto a dry starch.

Following are specific examples of the practice of our invention:

Example I 960 grams of a wheat starch and corn starch mixture were slurried, the wheat starch and corn starch each being present in a 50–50 ratio. The wheat starch was provided as a measured slurry and the amount of starch present was determined by the Baumé reading. The corn starch was added dry. The mixture was slurried with 7040 mls. of distilled water. To this slurry we then added 0.0015 gram of $ZnCl_2$ (approximately 0.00015% of the starch weight). The salt-slurry was then allowed to mix for 20 minutes with mild agitation, followed by a pH adjustment to 6.80. Then 0.24 gram of a commercial alpha amylase preparation was added (approximately 0.025% of the starch weight). After 2 minutes, an aliquot of the enzyme-salt-starch slurry was then removed and subjected to heating, using the Brabender amylograph, with the following temperature-time cycle:

(a) Rapid heating to 75° C.
(b) Holding for 14 minutes.
(c) Rapid heating to 95° C.
(d) Holding for 3 minutes.
(e) Cooling to 64° C.

The viscosity readings were: Peak viscosity—590 B.U.; viscosity at 20′—300 B.U. Afterwards a Brookfield end viscosity reading was obtained using a No. 1 spindle at 100 r.p.m. at 60°–64° C. This reading was 76.

Example II 960 grams of a wheat starch and corn starch mixture were slurried, the wheat starch and corn starch each being present in a 50–50 ratio. The wheat starch was provided as a measured slurry and the amount of starch present was determined by the Baumé reading. The corn starch was added dry. The mixture was slurried with 7040 mls. of distilled water. To this slurry we then added 0.0015 gram of $ZnCl_2$ (approximately 0.00015% of the starch weight). The salt-slurry was then allowed to mix for 20 minutes with mild agitation, followed by a pH adjustment to 6.80. Then 0.24 gram of a commercial alpha amylase preparation was added (approximately 0.025% of the starch weight). After 2 minutes, an aliquot of the enzyme-salt-starch slurry was then removed and subjected to heating, using the Brabender amylograph with the following temperature-time cycle:

(a) Rapid heating to 75° C.
(b) Holding for 10 minutes.
(c) Rapid heating to 95° C.
(d) Holding for 3 minutes.
(e) Cooling to 64° C.

The viscosity readings were: Peak viscosity—570 B.U.; viscosity at 20′—280 B.U. Afterwards a Brookfield end viscosity reading was obtained using a No. 1 spindle at 100 r.p.m. at 60°–64° C. This reading was 74.

Example III 960 grams of a wheat starch and corn starch mixture were slurried, the wheat starch and corn starch each being present in a 50–50 ratio. The wheat starch was provided as a measured slurry and the amount of starch present was determined by the Baumé reading. The corn starch was added dry. The mixture was slurried with 7040 mls. of distilled water. To this slurry we then added 0.0015 gram of $ZnCl_2$ (approximately 0.00015% of the starch weight). The salt-slurry was then allowed to mix for 20 minutes with mild agitation, followed by a pH adjustment to 6.80. Then 0.25 gram of a commercial alpha amylase preparation was added (approximately 0.025% of the starch weight). After 2 minutes, an aliquot of the enzyme-salt-starch slurry was then removed and subjected to heating, using the Brabender amylograph, with the following temperature-time cycle:

(a) Rapid heating to 75° C.
(b) Holding for 6 minutes.
(c) Rapid heating to 95° C.
(d) Holding for 3 minutes.
(e) Cooling to 64° C.

The viscosity readings were: Peak viscosity—570 B.U.; viscosity at 20′—270 B.U. Afterwards a Brookfield end viscosity reading was obtained using a No. 1 spindle at 100 r.p.m. at 60°–64° C. This reading was 74.

Example IV 1200 grams of a wheat starch and corn starch mixture were slurried, the wheat starch and corn starch each being present in a 50–50 ratio. The wheat starch was provided as a measured slurry, and the amount of wheat starch present was determined by the Baumé reading. The corn starch was added dry. The mixture was slurried with 10,800 mls. of distilled water. To this slurry we then added 0.0012 gram of $ZnCl_2$ (0.0001% of the starch weight). The salt-slurry mixture was then allowed to mix for 20 minutes with mild agitation. After adjusting the pH to 6.80, 0.30 gram of a commercial alpha amylase preparation (0.025% of the starch weight) was added. After 2 minutes, an aliquot of the mixture (enzyme-salt-starch slurry) was then removed and heated, using a Brabender amylograph, with the following temperature-time cycle:

(a) Rapid heating to 75° C.
(b) Holding for 14 minutes.
(c) Rapid heating to 95° C.
(d) Holding for 3 minutes.
(e) Cooling to 64° C.

The viscosity readings were: Peak viscosity—640 B.U.; viscosity at 20'—350 B.U. Afterwards a Brookfield end viscosity reading was obtained using a No. 1 spindle at 100 r.p.m. at 60°–64° C. This reading was 84.

*Example V*

1200 grams of a wheat starch and corn starch mixture were slurried, the wheat starch and corn starch each being present in a 50–50 ratio. The wheat starch was provided as a measured slurry and the amount of wheat starch present was determined by the Baumé reading. The corn starch was added dry. The mixture was slurried with 10,800 mls. of distilled water. To this slurry we then added 0.0012 gram of $ZnCl_2$ (0.0001% of the starch weight). The salt-slurry mixture was then allowed to mix for 20 minutes with mild agitation. After adjusting the pH to 6.80, 0.30 gram of a commercial alpha amylase preparation (0.025% of the starch weight) was added. After 2 minutes, an aliquot of the mixture (enzyme-salt-starch slurry) was then removed and heated, using a Brabender amylograph, with the following temperature-time cycle:

(a) Rapid heating to 75° C.
(b) Holding for 10 minutes.
(c) Rapid heating to 95° C.
(d) Holding for 3 minutes.
(e) Cooling to 64° C.

The viscosity readings were: Peak viscosity—550 B.U.; viscosity at 20'—250 B.U. Afterwards a Brookfield end viscosity reading was obtained using a No. 1 spindle at 100 r.p.m. at 60°–64° C. This reading was 80.

*Example VI*

1200 grams of a wheat starch and corn starch mixture were slurried, the wheat starch and corn starch each being present in a 50–50 ratio. The wheat starch was provided as a measured slurry and the amount of wheat starch present was determined by the Baumé reading. The corn starch was added dry. The mixture was slurried with 10,800 mls. of distilled water. To this slurry we then added 0.0012 gram of $ZnCl_2$ (0.0001% of the starch weight). The salt-slurry mixture was then allowed to mix for 20 minutes with mild agitation. After adjusting the pH to 6.80, 0.30 gram of a commercial alpha amylase preparation (0.025% of the starch weight) was added. After two minutes an aliquot of the mixture (enzyme-salt-starch slurry) was then removed and heated, using a Brabender amylograph, with the following temperature-time cycle:

(a) Rapid heating to 75° C.
(b) Holding for 6 minutes.
(c) Rapid heating to 95° C.
(d) Holding for 3 minutes.
(e) Cooling to 64° C.

The viscosity readings were: Peak viscosity—440 B.U.; viscosity at 20'—250 B.U. Afterwards a Brookfield end viscosity reading was obtained using a No. 1 spindle at 100 r.p.m. at 60°–64° C. This reading was 80.

*Example VII*

480 grams of a wheat starch and corn starch mixture were slurried, the wheat starch and corn starch each being present in a 50–50 ratio. The wheat starch was provided as a measured slurry and the amount of starch present was determined by the Baumé reading. The corn starch was added dry. This mixture was slurried with 3520 mls. of distilled water. To this slurry we then added 0.00240 gram of $ZnCl_2$ (0.0005% of the starch weight). The salt-slurry was then allowed to mix for 20 minutes with mild agitation, followed by a pH adjustment to 6.80. Then 0.120 gram of a commercial alpha amylase preparation was added (0.025% of the starch weight). After two minutes, an aliquot of the enzyme-salt-starch slurry was then removed and subjected to heating, using the Brabender amylograph, with the following temperature-time cycle:

(a) Rapid heating to 75° C.
(b) Holding for 14 minutes.
(c) Rapid heating to 95° C.
(d) Holding for 3 minutes.
(e) Cooling to 64° C.

The viscosity readings were: Peak viscosity—550 B.U.; viscosity at 20'—250 B.U. Afterwards a Brookfield end viscosity reading was obtained using a No. 1 spindle at 100 r.p.m. at 60°–64° C. This reading was 70.

*Example VIII*

480 grams of a wheat starch and corn starch mixture were slurried, the wheat starch and corn starch each being present in a 50–50 ratio. The wheat starch was provided as a measured slurry and the amount of starch present was determined by the Baumé reading. The corn starch was added dry. The mixture was slurried with 3520 mls. of distilled water. To this slurry we then added 0.00240 gram of $ZnCl_2$ (0.0005% of the starch weight). The salt-slurry was then allowed to mix for 20 minutes with mild agitation, followed by a pH adjustment to 6.80. Then 0.120 gram of a commercial alpha amylase preparation was added (0.025% of the starch weight). After two minutes, an aliquot of the enzyme-salt-slurry was then removed and subjected to heating, using the Brabender amylograph, with the following temperature-time cycle:

(a) Rapid heating to 75° C.
(b) Holding for 10 minutes.
(c) Rapid heating to 95° C.
(d) Holding for 3 minutes.
(e) Cooling to 64° C.

The viscosity readings were: Peak viscosity—450 B.U.; viscosity at 20'—200 B.U. Afterwards a Brookfield end viscosity reading was obtained using a No. 1 spindle at 100 r.p.m. at 60°–64° C. This reading was 67.

*Example IX*

480 grams of a wheat starch and corn starch mixture were slurried, the wheat starch and corn starch each being present in a 50–50 ratio. The wheat starch was provided as a measured slurry and the amount of starch present was determined by the Baumé reading. The corn starch was added dry. The mixture was slurried with 3520 mls. of distilled water. To this slurry we then added 0.00240 gram of $ZnCl_2$ (0.0005% of the starch weight). The salt-slurry was then allowed to mix for 20 minutes with mild agitation, followed by a pH adjustment to 6.80. Then 0.120 gram of a commercial alpha amylase preparation was added (0.025% of the starch weight). After two minutes, an aliquot of the enzyme-salt-starch slurry was then removed and subjected to heating, using the Brabender amylograph, with the following temperature-time cycle:

(a) Rapid heating to 75° C.
(b) Holding for 6 minutes.
(c) Rapid heating to 95° C.
(d) Holding for 3 minutes.
(e) Cooling to 64° C.

The viscosity readings were: Peak viscosity—470 B.U.; viscosity at 20'–200 B.U. Afterwards a Brookfield end viscosity reading was obtained using a No. 1 spindle at 100 r.p.m. at 60°–64° C. This reading was 64.

*Example X*

960 grams of a wheat starch and corn starch mixture were slurried, the wheat starch and corn starch each being present in a 50–50 ratio. The wheat starch was provided as a measured slurry, and the amount of wheat starch present was determined by the Baumé reading. The corn starch was added dry. The mixture was slurried with 7040 mls. of distilled water. To this slurry, we then added 0.0015 gram of $HgCl_2$ (approximately 0.00015% of the starch weight). The salt-slurry mixture was then allowed to mix for 20 minutes with mild agitation. After adjusting the pH to 6.80, 0.240 gram of a commercial alpha amylase preparation (approximately 0.025% of the starch weight) was added. After two minutes an aliquot of the mixture (enzyme-salt-starch slurry) was then removed and heated, using a Brabender amylograph, with the following temperature-time cycle:

(a) Rapid heating to 75° C.
(b) Holding for 14 minutes.
(c) Rapid heating to 95° C.
(d) Holding for 3 minutes.
(e) Cooling to 64° C.

There was no amylase activity due to the inhibitory effect of $Hg^{++}$.

*Example XI*

960 grams of a wheat starch and corn starch mixture were slurried, the wheat starch and corn starch each being present in a 50–50 ratio. The wheat starch was provided as a measured slurry, and the amount of wheat starch present was determined by the Baumé reading. The corn starch was added dry. The mixture was slurried with 7040 mls. of distilled water. To this slurry, we then added 0.0015 gram of $PbCl_2$ (approximately 0.00015% of the starch weight). The salt-slurry mixture was then allowed to mix for 20 minutes with mild agitation. After adjusting the pH to 6.80, 0.240 gram of commercial alpha amylase preparation (approximately 0.025% of the starch weight) was added. After two minutes, an aliquot of the mixture (enzyme-salt-starch slurry) was then removed and heated, using a Brabender amylograph, with the following temperature-time cycle:

(a) Rapid heating to 75° C.
(b) Holding for 14 minutes.
(c) Rapid heating to 95° C.
(d) Holding for 3 minutes.
(e) Cooling to 64° C.

There was no amylase activity due to the inhibitory effect of $Ph^{++}$.

*Example XII*

960 grams of a wheat starch and corn starch mixture were slurried, the wheat starch and corn starch each being present in a 50–50 ratio. The wheat starch was provided as a measured slurry and the amount of wheat starch present was determined by the Baumé reading. The corn starch was added dry. The mixture was slurried with 7040 mls. of distilled water. To this slurry we then added 0.0015 gram of $ZnSO_4$ (approximately 0.00015% of the starch weight). The salt-slurry mixture was then allowed to mix for 20 minutes with mild agitation. After adjusting the pH to 6.80, 0.240 gram of commercial alpha amylase preparation (approximately 0.025% of the starch weight) was added. After two minutes, an aliquot of the mixture (enzyme-salt-starch slurry) was then removed and heated, using a Brabender amylograph, with the following temperature-time cycle:

(a) Rapid heating to 75° C.
(b) Holding for 14 minutes.
(c) Rapid heating to 95° C.
(d) Holding for 3 minutes.
(e) Cooling to 64° C.

The viscosity readings were: Peak viscosity—860 B.U.; viscosity at 20'—420 B.U. Afterwards a Brookfield end viscosity reading was obtained using a No. 1 spindle at 100 r.p.m. at 60°–64° C. This reading was 90.

*Example XIII*

960 grams of a wheat starch and corn starch mixture were slurried, the wheat starch and corn starch each being present in a 50–50 ratio. The wheat starch was provided as a measured slurry and the amount of starch present was determined by the Baumé reading. The corn starch was added dry. The mixture was slurried with 7040 mls. of distilled water. To this slurry we then added 0.0015 of $ZnCl_2$ (approximately 0.00015% of the starch weight). The salt-slurry was then allowed to mix for 15 minutes with mild agitation, followed by a pH adjustment to 6.80. Then 0.240 gram of a commercial alpha amylase preparation was added (approximately 0.025% of the starch weight). After 2 minutes, an aliquot of the enzyme-salt-starch slurry was then removed and subjected to heating, using the Brabender amylograph with the following temperature-time cycle:

(a) Rapid heating to 75° C.
(b) Holding for 14 minutes.
(c) Rapid heating to 95° C.
(d) Holding for 3 minutes.
(e) Cooling to 64° C.

The viscosity readings were: Peak viscosity—590 B.U.; viscosity at 20'—310 B.U. Afterwards a Brookfield end viscosity reading was obtained using a No. 1 spindle at 100 r.p.m. at 60°–64° C. This reading was 80.

*Example XIV*

960 grams of a wheat starch and corn starch mixture were slurried, the wheat starch and corn starch each being present in a 50–50 ratio. The wheat starch was provided as a measured slurry and the amount of starch present was determined by the Baumé reading. The corn starch was added dry. The mixture was slurried with 7040 mls. of distilled water. To this slurry we then added 0.0015 gram of $ZnCl_2$ (approximately 0.00015% of the starch weight). The salt-slurry was then allowed to mix for 25 minutes with mild agitation, followed by a pH adjustment to 6.80. Then 0.240 gram of a commercial alpha amylase preparation was added (approximately 0.025% of the starch weight). After 2 minutes, an aliquot of the enzyme-salt-starch slurry was then removed and subjected to heating, using the Brabender amylograph with the following temperature-time cycle:

(a) Rapid heating to 75° C.
(b) Holding for 10 minutes.
(c) Rapid heating to 95° C.
(d) Holding for 3 minutes.
(e) Cooling to 64° C.

The viscosity readings were: Peak viscosity—570 B.U.; viscosity at 20'—290 B.U. Afterwards a Brookfield end viscosity reading was obtained using a No. 1 spindle at 100 r.p.m. at 60°–64° C. This reading was 76.

*Example XV*

960 grams of a wheat starch and corn starch mixture were slurried, the wheat starch and corn starch each being present in a 50–50 ratio. The wheat starch was provided as a measured slurry, and the amount of wheat starch present was determined by the Baumé reading. The corn starch was added dry. The mixture was slurried with 7040 mls. of distilled water. To this slurry, we then added 0.0015 gram of $ZnCl_2$ (approximately 0.00015% of the starch weight). The salt-slurry mixture was then allowed to mix for 30 minutes with mild agitation. After adjusting the pH to 6.80, 0.240 gram of a commercial alpha amylase preparation (approximately 0.025% of the starch weight) was added. After 2 minutes, an aliquot of the mixture (enzyme-salt-starch slurry) was then removed and heated, using a Brabender amylograph, with the following temperature-time cycle:

(a) Rapid heating to 75° C.
(b) Holding for 14 minutes.
(c) Rapid heating to 95° C.
(d) Holding for 3 minutes.
(e) Cooling to 64° C.

The viscosity readings were: Peak viscosity—570 B.U.; viscosity at 20'—280 B.U. Afterwards a Brookfield end viscosity reading was obtained using a No. 1 spindle at 100 r.p.m. at 60°–64° C. This reading was 74.

*Example XVI*

960 grams of a wheat starch and corn starch mixture were slurried, the wheat starch and corn starch each being present in a 50–50 ratio. The wheat starch was provided as a measured slurry and the amount of wheat starch present was determined by the Baumé reading. The corn starch was added dry. The mixture was slurried with 7040 mls. of distilled water. The slurry was then allowed to mix for 20 minutes with mild agitation. After adjusting the pH to 6.80, 0.240 gram of a commercial alpha amylase preparation of (0.025% of the starch weight) was added. After 2 minutes, an aliquot of the mixture (enzyme-starch slurry) was then removed and heated, using a Brabender amylograph, with the following temperature-time cycle:

(a) Rapid heating to 75° C.
(b) Holding for 14 minutes.
(c) Rapid heating to 95° C.
(d) Holding for 3 minutes.
(e) Cooling to 64° C.

The viscosity readings were: Peak viscosity—1000 B.U.; viscosity at 20'—800 B.U. Afterwards a Brookfield end viscosity reading was attempted, using a No. 1 spindle at 100 r.p.m. at 60°–64° C. The reading was not measurable.

*Example XVII*

960 grams of a wheat starch and corn starch mixture were slurried, the wheat starch and corn starch each being present in a 50–50 ratio. The wheat starch was provided as a measured slurry and the amount of starch present was determined by the Baumé reading. The corn starch was added dry. The mixture was slurried with 7040 mls. of distilled water. The slurry was then allowed to mix for 20 minutes with mild agitation, followed by a pH adjustment to 6.80. Then 0.240 gram of a commercial alpha amylase preparation was added (0.025% of the starch weight). An aliquot of the enzyme-salt-starch slurry was then removed and subjected to heating, using the Brabender amylograph with the following temperature-time cycle:

(a) Rapid heating to 75° C.
(b) Holding for 6 minutes.
(c) Rapid heating to 95° C.
(d) Holding for 3 minutes.
(e) Cooling to 64° C.

The viscosity readings were: Peak viscosity—1000 B.U.; viscosity at 20'—1000 B.U. Afterwards a Brookfield end viscosity reading was attempted using a No. 1 spindle at 100 r.p.m at 60°–64° C. The reading was not measurable.

*Example XVIII*

960 grams of a wheat starch and corn starch mixture were slurried, the wheat starch and corn starch each being present in a 50–50 ratio. Both the wheat starch and the corn starch were weighed and mixed dry and then the dry mixture of the wheat starch and corn starch was slurried with 7040 mls. of distilled water. To this slurry we then added 0.0015 gram of $ZnCl_2$ (approximately 0.00015% of the starch weight). The salt-slurry was then allowed to mix for 20 minutes with mild agitation, followed by a pH adjustment to 6.80. Then 0.240 gram of a commercial alpha amylase preparation was added 0.025% of the starch weight). After 2 minutes an aliquot of the enzyme-salt-starch slurry was then removed and subjected to heating, using the Brabender amylograph with the following temperature-time cycle:

(a) Rapid heating to 75° C.
(b) Holding for 14 minutes.
(c) Rapid heating to 95° C.
(d) Holding for 3 minutes.
(e) Cooling to 64° C.

The viscosity readings were: Peak viscosity—590 B.U.; viscosity at 20'—330 B.U. Afterwards a Brookfield end viscosity reading was obtained using a No. 1 spindle at 100 r.p.m. at 60°–64° C. This reading was 84.

*Example XIX*

960 grams of a wheat starch were slurried. The starch was provided as a measured slurry, and the amount of starch present was determined by the Baumé reading. The mixture was slurried with 7040 mls. of distilled water. To this slurry, we then added 0.0015 gram of $ZnCl_2$ (approximately 0.00015% of the starch weight). The salt-slurry mixture was then allowed to mix for 20 minutes with mild agitation. After adjusting the pH to 6.80, 0.240 gram of a commercial alpha amylase preparation (0.025% of the starch weight) was added. After 2 minutes, an aliquot of the mixture (enzyme-salt-starch slurry) was then removed and heated, using a Brabender amylograph, with the following temperature-time cycle:

(a) Rapid heating to 75° C.
(b) Holding for 14 minutes.
(c) Rapid heating to 95° C.
(d) Holding for 3 minutes.
(e) Cooling to 64° C.

The viscosity readings were: Peak viscosity—600 B.U.; viscosity at 20'—280 B.U. Afterwards a Brookfield end viscosity reading was obtained using a No. 1 spindle at 100 r.p.m. at 60°–64° C. The reading was 80.

*Example XX*

960 grams of a corn starch were added dry and were slurried with 7040 mls. of distilled water. To this slurry, we then added 0.0015 gram of $ZnCl_2$ (approximately 0.00015% of the starch weight). The salt-slurry mixture was then allowed to mix for 20 minutes with mild agitation. After adjusting the pH to 6.80, 0.240 gram of a commercial alpha amylase preparation (0.025% of the starch weight) was added. After 2 minutes an aliquot of the mixture (enzyme-salt-starch slurry) was then removed and heated, using a Brabender amylograph, with the following temperature-time cycle:

(a) Rapid heating to 75° C.
(b) Holding for 14 minutes.
(c) Rapid heating to 95° C.
(d) Holding for 3 minutes.
(e) Cooling to 64° C.

The viscosity readings were: Peak viscosity—640 B.U.; viscosity at 20'—320 B.U. Afterwards a Brookfield end viscosity reading was obtained using a No. 1 spindle at 100 r.p.m. at 60°–64° C. The reading was 82.

Following are tables summarizing the results obtained in the above examples and showing end viscosities achieved in other tests:

TABLE I.—END VISCOSITY OF ENZYME CONVERTED ZnCl₂-STARCH MIXTURES

| Example number | Amount of ZnCl₂ | | Holding time in minutes at 75° C. for enzyme conversion | Viscosities measured | | |
|---|---|---|---|---|---|---|
| | Percentage of starch weight | Parts per million by weight | | Peak in B.U. | At 20 minutes in B.U. | Brookfield end viscosity [1] |
| I | .00015 | 1.5 | 14 | 590 | 300 | 76 |
| II | .00015 | 1.5 | 10 | 570 | 280 | 74 |
| III | .00015 | 1.5 | 6 | 570 | 270 | 74 |
| IV | .0001 | 1.0 | 14 | 640 | 350 | 84 |
| V | .0001 | 1.0 | 10 | 550 | 250 | 80 |
| VI | .0001 | 1.0 | 6 | 440 | 250 | 80 |
| VII | .0005 | 5.0 | 14 | 550 | 250 | 70 |
| VIII | .0005 | 5.0 | 10 | 450 | 200 | 67 |
| IX | .0005 | 5.0 | 6 | 470 | 200 | 64 |
| XVI | 0.0 | 0.0 | 14 | 1000 | 800 | (²) |
| XVII | 0.0 | 0.0 | 6 | 1000 | 1000 | (²) |
| XVIII | 0.00015 | 1.5 | 14 | 590 | 330 | 84 |
| XIX | 0.00015 | 1.5 | 14 | 600 | 280 | 80 |
| XX | 0.00015 | 1.5 | 14 | 640 | 370 | 82 |

[1] #1 Spindle at 100 r.p.m. at 60° C.
[2] Not measurable.

TABLE II.—END VISCOSITY OF ENZYME CONVERTED STARCH MIXTURES USING DIFFERENT SALTS

| Example number | Kind of salt | Parts per million by weight | Holding time in minutes at 75° C. for enzyme conversion | Viscosities measured | | |
|---|---|---|---|---|---|---|
| | | | | Peak in B.U. | At 20 minutes in B.U. | Brookfield end viscosity [1] |
| I | ZnCl₂ | 1.5 | 14 | 590 | 300 | 76 |
| X | HgCl₂ | 1.5 | 14 | No amylase activity due to inhibitory effect of Hg⁺⁺. | | |
| XI | PbCl₂ | 1.5 | 14 | No amylase activity due to inhibitory effect of Pb⁺⁺. | | |
| XII | ZnSO₄ | 1.5 | 14 | 860 | 420 | 90 |
| XVI | 0.0 | 0 | 14 | 1,000 | 800 | (²) |
| XVII | 0.0 | 0 | 6 | 1,000 | 800 | (²) |

[1] #1 Spindle at 100 r.p.m. at 60° C.
[2] Not measurable.

TABLE III.—EFFECT OF MIXING TIME ON END VISCOSITY OF ENZYME CONVERTED-ZnCl₂ STARCH MIXTURE

| Example number | Mixing time in minutes | ZnCl₂ parts per million by weight | Holding time in minutes at 75° C. for enzyme conversion | Viscosities measured | | |
|---|---|---|---|---|---|---|
| | | | | Peak in B.U. | At 20 min. in B.U. | Brookfield end viscosity [1] |
| I | 20 | 1.5 | 14 | 590 | 300 | 76 |
| XIII | 15 | 1.5 | 14 | 590 | 310 | 80 |
| XIV | 25 | 1.5 | 14 | 570 | 290 | 76 |
| XV | 30 | 1.0 | 14 | 570 | 280 | 74 |

[1] #1 spindle at 100 r.p.m. at 60° C.

TABLE IV.—SHOWING DIFFERENCE IN ENZYMATIC CONVERSION BY USE OF ZnCl₂ BETWEEN ADDING WHEAT STARCH AS A SLURRY OR ADDING IT DRY

| Example number | Dry D or Slurry S | Percent of salt use | Holding time | Peak viscosity | Viscosity at 20′ | End viscosity [1] |
|---|---|---|---|---|---|---|
| I | S | 0.00015 | 14 | 590 | 300 | 76 |
| XVIII | D | 0.00015 | 14 | 590 | 330 | 84 |

[1] #1 spindle at 100 r.p.m. at 60° C.

In the following Table V we have recapitulated the end viscosity of all of the above examples and have also shown end viscosity of other tests not specifically set out in the examples:

TABLE V

| Ex. No. | Wheat starch dry or slurry | Quantities of water in mls. | Grams of salt | Grams of starch | Kind of salt | Mix time in minutes | Enzyme activation time in minutes | End viscosity |
|---|---|---|---|---|---|---|---|---|
| 1 | S | 7,040 | 0.0015 | 960 | $ZnCl_2$ | 20 | 14 | 76 |
| 2 | S | 7,040 | 0.0015 | 960 | $ZnCl_2$ | 20 | 10 | 74 |
| 3 | S | 7,040 | 0.0015 | 960 | $ZnCl_2$ | 20 | 6 | 74 |
| 4 | S | 10,800 | 0.0012 | 1,200 | $ZnCl_2$ | 20 | 14 | 84 |
| 5 | S | 10,800 | 0.0012 | 1,200 | $ZnCl_2$ | 20 | 10 | 80 |
| 6 | S | 10,800 | 0.0012 | 1,200 | $ZnCl_2$ | 20 | 6 | 80 |
| 7 | S | 3,520 | 0.0024 | 480 | $ZnCl_2$ | 20 | 14 | 70 |
| 8 | S | 3,520 | 0.0024 | 480 | $ZnCl_2$ | 20 | 10 | 67 |
| 9 | S | 3,520 | 0.0024 | 480 | $ZnCl_2$ | 20 | 6 | 64 |
| 10 | S | 7,040 | 0.0015 | 960 | $HgCl_2$ | 20 | 14 | (1) |
| 11 | S | 7,040 | 0.0015 | 960 | $PbCl_2$ | 20 | 14 | (1) |
| 12 | S | 7,040 | 0.0015 | 960 | $ZnSO_4$ | 20 | 14 | 90 |
| 13 | S | 7,040 | 0.0015 | 960 | $ZnCl_2$ | 15 | 14 | 80 |
| 14 | S | 7,040 | 0.0015 | 960 | $ZnCl_2$ | 25 | 14 | 76 |
| 15 | S | 7,040 | 0.0015 | 960 | $ZnCl_2$ | 30 | 14 | 74 |
| 16 | S | 7,040 | None | 960 | | 20 | 14 | (2) |
| 17 | S | 7,040 | None | 960 | | 20 | 6 | (2) |
| 18 | D | 7,040 | 0.0015 | 960 | $ZnCl_2$ | 20 | 14 | 76 |
| 19 | S | 7,040 | 0.0015 | 960 | $ZnCl_2$ | 20 | 14 | 80 |
| 20 | D corn only | 7,040 | 0.0015 | 960 | $ZnCl_2$ | 20 | 14 | 22 |

| Dry or slurry | Water in liters | Salt in grams | Starch in grams | Kind of salt | Mix time | Enzyme activation time | End viscosity |
|---|---|---|---|---|---|---|---|
| S | 1 | 0.01 | 960 | $ZnCl_2$ | 20 | 12 | 180 |
| S | 1 | 0.10 | 960 | $ZnCl_2$ | 20 | 12 | 194 |
| S | 1 | 0.005 | 960 | $ZnCl_2$ | 20 | 12 | 92 |
| S | 1 | 0.0025 | 960 | $ZnCl_2$ | 20 | 12 | 93 |

[1] No amylase activity due to inhibitory effect of $Hg^{++}$ and of $Pb^{++}$.
[2] Not measurable.

The additional tests listed above show that even higher ratios of salt to starch show beneficial results over the results of enzyme activity on starch slurries with no salt added. They also show that a high starch to water ratio slows down enzyme activity.

It is to be understood that the above described embodiments of our invention are for the purpose of illustration only, and various changes may be made thereto without departing from the spirit and scope of the invention.

We claim:

1. A process of treating starch which consists of the steps of
    forming a substantially homogeneous mixture of zinc chloride and a starch slurry in a proportion in the range of from 1 to 100 parts of the salt to a million parts of starch based on the dry weight of the starch; and
    allowing the components to remain in mixed contact for a period of at least 10 minutes.

2. A process of treating starch which consists of the steps of
    preparing a starch slurry having a concentration of starch in the range of from 3.8 to 4.0 lbs. of starch to each gallon of water
    forming a substantially homogeneous mixture consisting of said starch slurry and zinc chloride salt in a proportion in the range of from 1 to 100 parts of the salt to each million parts of starch based on the dry starch in the slurry;
    mixing with agitation for at least ten minutes; and
    drying the slurry.

3. A process of treating starch which consists of the steps of
    adding zinc chloride to starch in a proportion of about 1.5 parts of the zinc chloride salt to a million parts of starch based on the dry weight of the starch;
    mixing to a substantially homogeneous condition;
    adding an amylase;
    raising the temperature to and maintaining an enzyme activating temperature of about 75° C. for a period of time of from 6 to 14 minutes; and
    increasing the temperature to about 95° C. to deactivate and terminate the enzyme action.

4. A process of treating starch which consists of the steps of
    forming a homogeneous mixture consisting of zinc chloride and a starch slurry;
    in a proportion in the range of up to 100 parts of said zinc chloride to a million parts of starch based on the dry weight of the starch, and
    allowing the components to remain in mixed contact for a period of at least ten minutes.

5. A process of treating starch which consists of the steps of
    forming a homogeneous mixture consisting of a metal salt and a starch slurry having starch in a range of from 3.8 to 4.0 lbs. of starch to each gallon of water;
    said metal salt being selected from the group consisting of zinc chloride and zinc sulfate,
    in a proportion in the range of from 1 to 100 parts of salt to a million parts of starch based on the dry weight of the starch in the slurry; and
    mixing with agitation for a period of at least ten minutes.

6. The process of claim 9 in which the metal salt is zinc chloride.

7. The process of claim 9 in which the metal salt is zinc sulfate.

8. The process of claim 4 in which the salt is added in a proportion of 1.5 parts of salt to a million parts of starch based on the dry weight of the starch in the slurry.

9. The process of claim 5 in which the slurry is dried after the completion of the mixing step.

10. A process of treating starch which consists of the steps of
    adding to starch an alpha amylase enzyme and a metal salt, the salt being selected from the group consisting of zinc chloride and zinc sulfate,
    in a proportion in the range of up to 100 parts of salt to a million parts of starch based on the dry weight of the starch;
    mixing to a homogeneous condition;
    raising the temperature to, and maintaining, an enzyme activating temperature for a period sufficient to liquefy the starch to the desired extent; and increasing the temperature to deactivate the enzymatic action.

11. The process of claim 10 in which the salt is zinc chloride.

12. The process of claim 10 in which the salt is added in a proportion of about 1.5 parts of salt by weight to a million parts of starch.

13. The process of claim 10 in which the temperature of the mixture is maintained at about 75° C. during the enzyme activation period.

14. The process of claim 10 in which the temperature is raised to about 95° C. at the end of the enzyme activation period to terminate the enzyme action.

15. The process of claim 10 in which the enzyme action is allowed to continue for a period of from about 6 to 14 minutes.

References Cited by the Examiner

UNITED STATES PATENTS

| | | | |
|---|---|---|---|
| 1,273,571 | 7/1918 | Bloede | 106—210 |
| 2,380,848 | 7/1945 | Kerr | 195—17 |
| 2,619,428 | 11/1952 | Kerr | 195—31 |
| 2,709,672 | 5/1955 | Petty | 195—114 |
| 2,783,167 | 8/1953 | Lineberry et al. | 127—33 |
| 2,797,187 | 6/1957 | Szumski et al. | 195—100 |
| 3,151,038 | 9/1964 | Gray | 195—100 X |

A. LOUIS MONACELL, *Primary Examiner.*

A. E. TANENHOLTZ, *Assistant Examiner.*

UNITED STATES PATENT OFFICE
CERTIFICATE OF CORRECTION

Patent No. 3,251,748                                                     May 17, 1966

Robert L. High et al.

It is hereby certified that error appears in the above numbered patent requiring correction and that the said Letters Patent should read as corrected below.

Column 4, line 44, for "0.25 gram" read -- 0.24 gram --; column 7, line 53, for "of Ph++" read -- of Pb++ --; column 8, line 4, for "After wards" read -- Afterwards --; line 16, for "0.0015 of" read -- 0.0015 gram of --; column 9, line 28, for "preparation of (0.025%" read -- preparation (0.025% --; column 10, line 9, for "0.025%" read -- (0.025% --;

Signed and sealed this 15th day of August 1967.

(SEAL)
Attest:

Edward M. Fletcher, Jr.                                       EDWARD J. BRENNER
Attesting Officer                                                Commissioner of Patents